United States Patent
Howard

Patent Number: 5,305,611
Date of Patent: Apr. 26, 1994

[54] CRYOGENIC RECTIFICATION SYSTEM WITH THERMALLY INTEGRATED ARGON COLUMN

[75] Inventor: Henry E. Howard, Grand Island, N.Y.

[73] Assignee: Praxair Technology, Inc., Danbury, Conn.

[21] Appl. No.: 966,108

[22] Filed: Oct. 23, 1992

[51] Int. Cl.$^5$ .............................................. F25J 3/04
[52] U.S. Cl. ............................................ 62/22; 62/39; 62/41
[58] Field of Search ................................ 62/22, 39, 41

[56] References Cited

U.S. PATENT DOCUMENTS

| | | | |
|---|---|---|---|
| 1,880,981 | 10/1932 | Pollitzer et al. | |
| 2,316,056 | 4/1943 | Baufre | 62/175.5 |
| 2,545,462 | 3/1951 | Haynes | 62/175.5 |
| 2,559,132 | 7/1951 | Roberts | 62/175.5 |
| 2,700,282 | 1/1955 | Roberts | 62/175.5 |
| 3,447,331 | 6/1969 | Smith | 62/13 |
| 4,137,056 | 1/1979 | Golovko | 62/13 |
| 4,433,990 | 2/1984 | Olszewski | 62/22 |
| 4,670,031 | 6/1987 | Erickson | 62/22 |
| 4,737,177 | 4/1988 | Erickson | 62/22 |
| 4,784,677 | 11/1988 | Al-Chalabi | 62/37 |
| 4,822,395 | 4/1989 | Cheung | 62/22 |
| 4,842,625 | 6/1989 | Allam et al. | 62/22 |
| 5,019,145 | 5/1991 | Rohde et al. | 62/22 |
| 5,034,043 | 7/1991 | Rottman | 62/22 |
| 5,049,174 | 9/1991 | Thorogood et al. | 62/22 |
| 5,077,978 | 1/1992 | Agrawal et al. | 62/22 |
| 5,114,449 | 5/1992 | Agrawal et al. | 62/22 |

*Primary Examiner*—Ronald C. Capossela
*Attorney, Agent, or Firm*—Stanley Ktorides

[57] ABSTRACT

A cryogenic rectification system for enhancing the recovery of argon wherein the pressure of the argon column is reduced from that of other columns in the system and a small stripping section is created within the argon column by the use of an additional condenser/reboiler and by the introduction of the argon column feed at an intermediate point of the column.

9 Claims, 1 Drawing Sheet

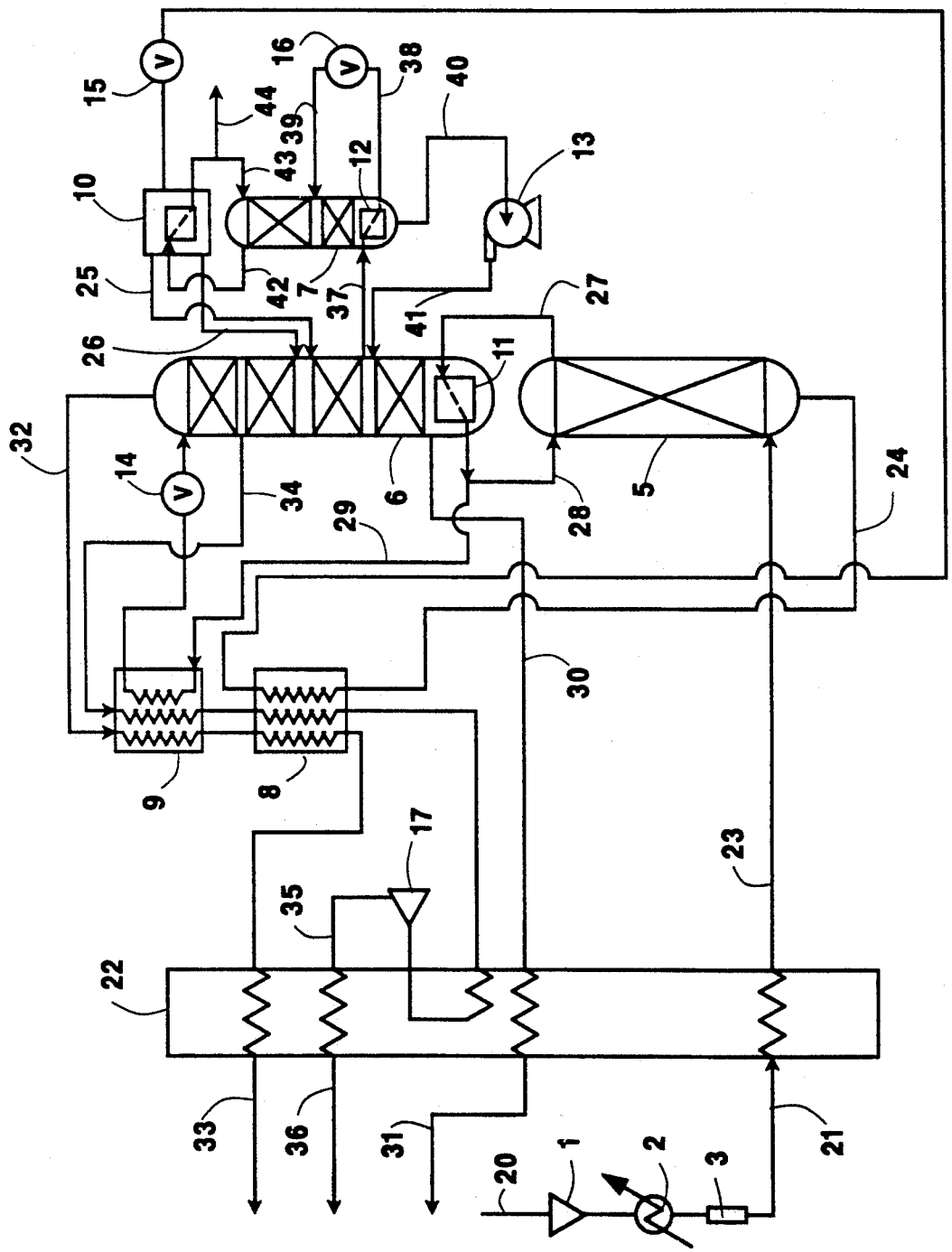

CRYOGENIC RECTIFICATION SYSTEM WITH THERMALLY INTEGRATED ARGON COLUMN

TECHNICAL FIELD

This invention relates generally to cryogenic rectification and more particularly to cryogenic rectification employing an argon column.

BACKGROUND ART

Argon is becoming increasingly more important for use in many industrial applications such as in the production of stainless steel, in the electronics industry, and in reactive metal production such as titanium processing.

Argon is generally produced by the cryogenic rectification of air. Air contains about 78 percent nitrogen, 21 percent oxygen and less than 1 percent argon. Because the argon concentration in air is relatively low, it has the highest per unit value of the major atmospheric gases. However, conventional cryogenic air separation processes can recover only about 80 to 90 percent of the argon in the feed air. Thus it is desirable to increase the recovery of argon produced by the cryogenic rectification of air.

SUMMARY OF THE INVENTION

The above and other objects which will become apparent to one skilled in the art upon a reading of this disclosure can be attained by the present invention, one aspect of which is:

A cryogenic rectification method for producing argon comprising:

(A) providing a feed comprising argon into a main column system and carrying out cryogenic rectification within the main column system;

(B) withdrawing argon-containing vapor from the main column system and condensing said argon-containing vapor;

(C) reducing the pressure of the resulting argon-containing liquid;

(D) providing reduced pressure argon-containing liquid as feed into an argon column at an intermediate point of the argon column and separating the feed by cryogenic rectification into argon-richer fluid and argon-leaner fluid;

(E) withdrawing argon-leaner fluid from the argon column, increasing its pressure, and passing increased pressure argon-leaner fluid into the main column system; and (F) recovering argon-richer fluid as product argon.

Another aspect of the invention is: A cryogenic rectification apparatus for producing argon comprising:

(A) a main column system and means for providing feed into the main column system;

(B) an argon column, a condenser and means for passing fluid from the main column system to the condenser;

(C) means for passing fluid from the condenser into the argon column at an intermediate point of the argon column;

(D) means for reducing the pressure of fluid passed from the condenser into the argon column;

(E) means for withdrawing fluid from the lower portion of the argon column, means for increasing the pressure of the withdrawn fluid, and means for passing the increased pressure withdrawn fluid into the main column system; and (F) means for recovering fluid taken from the upper portion of the argon column.

As used herein the terms "upper portion" and "lower portion" mean those sections of a column respectively above and below the midpoint of a column.

As used herein the term "feed air" means a mixture comprising primarily nitrogen, oxygen and argon, such as air.

As used herein the term "turboexpansion" means the flow of high pressure gas through a turbine to reduce the pressure and the temperature of the gas thereby generating refrigeration.

As used herein the term "column", means a distillation or fractionation column or zone, i.e., a contacting column or zone wherein liquid and vapor phases are countercurrently contacted to effect separation of a fluid mixture, as for example, by contacting or the vapor and liquid phases on a series of vertically spaced trays or plates mounted within the column and/or on packing elements which may be structured packing and/or random packing elements. For a further discussion of distillation columns, see the Chemical Engineers' Handbook fifth edition, edited by R. H. Perry and C. H. Chilton, McGraw-Hill Book Company, New York, Section 13, *The Continuous Distillation Process*. The term, double column is used to mean a higher pressure column having its upper end in heat exchange relation with the lower end of a lower pressure column. A further discussion of double columns appears in Ruheman "The Separation of Gases" Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns,. Cryogenic rectification is a rectification process carried out at least in part at temperatures at or below 123 degrees Kelvin.

As used herein the term "indirect heat exchange" means the bringing of two fluid streams into heat exchange relation without any physical contact or intermixing of the fluids with each other.

As used herein the term "argon column" means a column which processes a feed comprising argon and produces a product having an argon concentration which exceeds that of the feed and which may include a heat exchanger or a top condenser in its upper portion.

As used herein the term "equilibrium stage" means a contact process between vapor and liquid such that the exiting vapor and liquid streams are in equilibrium.

BRIEF DESCRIPTION OF THE DRAWINGS

The sole FIGURE is a schematic flow diagram of one preferred embodiment of the cryogenic rectification system of this invention.

DETAILED DESCRIPTION

In conventional cryogenic rectification practice employing a main column system and an argon sidearm column, the argon column is generally coupled to the upper column of a double column system so that they operate at about the same pressure. This invention includes the partial uncoupling of the argon column from the main column system so that it may operate at a lower pressure than would otherwise be possible. The lower pressure increases the relative volatilities between argon and the other major components of the feed undergoing separation in the argon column thus enabling a greater amount of the argon fed into the column to be recovered and reducing the amount of argon passed out of the argon column with the other components. The argon column is thermally integrated with the main column system in a manner which creates a small stripping section in the argon column which reduces the argon content of descending liquid within the argon column resulting in a large increase in argon recovery.

The invention will be described in detail with reference to the FIGURE which illustrates the use of the invention to produce product crude argon from a feed comprising oxygen, nitrogen and argon, e.g. air, wherein the main column system is a double column.

Referring now to the FIGURE, feed air is compressed by passage through compressor 1, cooled by passage through cooler 2 to remove the heat of compression, and cleaned of high boiling impurities such as water vapor, carbon dioxide and hydrocarbons by passage through purifier 3. Cleaned, cooled, compressed feed air 21 is then cooled by passage through main heat exchanger 22 by indirect heat exchange with return streams and the resulting cooled feed air 23 is passed into column 5 which is the higher pressure column of a double column system which is the main column system in the practice of this embodiment of the invention. Column 5 is operating generally within the range of from 65 to 220 pounds per square inch absolute (psia).

Within column 5 the feed air is separated by cryogenic rectification into oxygen-enriched liquid and nitrogen-enriched vapor. Oxygen-enriched liquid is withdrawn from the lower portion of column 5 in stream 24, subcooled by passage through heat exchanger 8 by indirect heat exchange with return streams and then passed through valve 15 and into argon column top condenser 10 wherein it is partially vaporized by indirect heat exchange with argon-richer vapor as will be more fully discussed later. The resulting vapor and remaining liquid are passed from top condenser 10 in streams 25 and 26 respectively into column 6 which is the lower pressure column of the double column system. Column 6 is operating at a pressure less than that at which column 5 is operating and generally within the range of from 14.7 to 75 psia.

Nitrogen-enriched vapor is passed from the upper portion of column 5 in stream 27 into main condenser 11 wherein it is condensed by indirect heat exchange with oxygen-rich bottoms of lower pressure column 6. Resulting nitrogen-enriched liquid is passed as stream 28 into column 5 as reflux. A portion of the nitrogen-enriched liquid is passed in stream 29 through heat exchanger 9 wherein it is subcooled by indirect heat exchange with return streams, and passed through valve 14 and into column 6 as reflux. If desired, a portion of the nitrogen-enriched liquid may be recovered as product liquid nitrogen.

Within column 6 the feeds are separated by cryogenic rectification into nitrogen-rich fluid and oxygen-rich fluid. Oxygen-rich vapor is withdrawn from the lower portion of column 6 in stream 30, warmed by passage through main heat exchanger 22 and may be recovered as product oxygen gas 31. If desired, oxygen-rich liquid may be withdrawn from column 6 in the area of main condenser 11 and recovered as product liquid oxygen. Nitrogen-rich vapor is withdrawn from the upper portion of column 6 in stream 32, warmed by passage through heat exchangers 9 and 8 and main heat exchanger 22, and may be recovered as product nitrogen gas 33.

For product purity control purposes a waste stream 34 is withdrawn from the upper portion of column 6 below the withdrawal point of stream 32. Stream 34 is warmed by passage through heat exchangers 9 and 8 and partially traverses main heat exchanger 22. Stream 34 is then expanded through turboexpander 17 to generate refrigeration and resulting turboexpanded stream 35 is warmed by passage through main heat exchanger 22 whereby refrigeration is put into the process by transfer to the feed air. Resulting waste stream 36 is then removed from the system. Refrigeration may be put into the system in other ways well known to those skilled in the art such as by expansion of a portion of the feed air followed by passage into the lower pressure column, the expansion of nitrogen from the higher pressure column, the expansion of a product stream, or the expansion of the entire feed air stream.

Argon-containing vapor is withdrawn from the main column system. In the embodiment illustrated in the FIGURE, argon-containing vapor is withdrawn as stream 37 from column 6 at a point at least one equilibrium stage above the area of main condenser 11 where nitrogen-enriched vapor is condensed against oxygen-rich fluid. Preferably this withdrawal is at a point within the range of from 10 to 40 equilibrium stages above the described heat exchange. The argon-containing vapor generally comprises from about 5 to 20 mole percent argon with the remainder comprised mostly of oxygen.

At least some of the argon-containing vapor is passed into latent heat exchanger or condenser 12 wherein it is condensed. Condenser 12 may be within argon column 7 as illustrated in the FIGURE, or it may be outside argon column 7. The resulting argon-containing liquid 38 is reduced in pressure by passage through valve 16 and the reduced pressure argon-containing liquid 39 passed as feed into argon column 7. If desired, a portion of the argon-containing vapor or a second argon-containing vapor stream may be reduced in pressure and passed directly into the argon column as feed without undergoing condensation.

The reduced pressure argon-containing liquid is passed into argon column 7 as feed at an intermediate point, i.e. above the lowermost equilibrium stage and below the uppermost equilibrium stage of argon column 7. Argon column 7 is operating at a pressure less than that at which column 6 is operating. Preferably the operating pressure of argon column 7 is at least 3 psi below that of column 6 and generally is within the range of from 10 to 70 psia. If desired, the operating pressure of argon column 7 at least within its upper portion may be below the ambient pressure. This lower pressure is a major advantage of the uncoupling of the argon column from the main column system by virtue of the condensation of the argon-containing vapor in stream 37 at a higher pressure and the return of pressurized argon-leaner fluid back to the main column system as will subsequently be described.

Within argon column 7 the feed is separated by cryogenic rectification into argon-richer fluid and argon-leaner fluid. Preferably the argon-containing vapor is condensed in condenser 12 by indirect heat exchange with argon-leaner fluid. The argon-leaner fluid comprises mostly oxygen. Generally the argon-leaner fluid comprises from about 82 to 97 mole percent oxygen with the remainder being argon. Argon-leaner fluid is withdrawn from the lower portion of argon column 7 in stream 40, is increased in pressure such as by passage through pump 13 and is passed as stream 41 into column 6 of the main column system. If the argon column is at a sufficient elevation relative to the other columns, the pressure of the argon-leaner fluid may be increased by liquid head pressure thus eliminating the need for mechanical pump 13. In this case a mechanical pump may be necessary to pass oxygen-enriched fluid from column 5 to top condenser 10.

Argon-richer fluid generally comprises at least 80 mole percent argon. Argon-richer fluid is passed as stream 42 from the upper portion of argon column 7 into condenser 10 wherein it is cooled by indirect heat exchange with partially vaporizing oxygen-enriched liquid. The resulting argon-richer fluid is passed back into the upper portion of column 7 as stream 43 while a portion 44 of the argon-richer fluid is recovered as product argon.

The invention enhances the argon recovery by means of thermal integration of the overall column arrangement while uncoupling the pressure requirement of the argon column from that of the other columns in the arrangement. Several aspects of the invention act synergistically to improve the recovery of argon. The relative volatility of the argon/oxygen binary increases with decreasing pressure. The invention advantageously conducts the argon oxygen separation at lower pressures. The elevation in pressure of the lower pressure column of the double column system does not necessitate the operation of the argon column at the same pressure.

The invention employs the use of an auxiliary condenser, preferably located in the base of the argon column. The feed to the argon column is condensed prior to its introduction to the argon column. Since this condensation occurs preferably at the base of the argon column a small stripping section within the argon column is created. This small stripping section further reduces the argon content in the enriched oxygen descending the argon column and returning to the lower pressure column. Consequently, the argon column recovers a greater fraction of the argon fed to it. Additionally, the feed to the argon column is reduced in pressure prior to entry into the argon column. The reduced pressure of operation further facilitates argon recovery due to the increased relative volatilities of the argon/oxygen binary.

A computer simulation of the invention was carried out employing the embodiment of the invention illustrated in the FIGURE. The pressure at the top of lower pressure column 6 was 27.3 psia while the pressure at the top of argon column 7 was 23.7 psia and the pressure at the base of higher pressure column 5 was 102.6 psia. The resultant argon recovery was 92.7 percent. Argon recoveries with comparable conventional systems would typically be only about 86.5 percent.

Now by the use of this invention one can improve the recovery of argon from an argon-containing feed without requiring the input of additional energy into the system such as by using additional compression equipment. While the invention has been described in detail with reference to a certain preferred embodiment, those skilled in the art will recognize that there are other embodiments of the invention within the spirit and the scope of the claims. For example, other fluids such as liquid oxygen, liquid nitrogen or liquid air may be employed in the condenser of the argon column.

I claim:

1. A cryogenic rectification method for producing argon comprising:
   (A) providing a feed comprising argon into a main column system and carrying out cryogenic rectification within the main column system;
   (B) withdrawing argon-containing vapor from the main column system and condensing said argon-containing vapor;
   (C) reducing the pressure of the resulting argon-containing liquid;
   (D) providing reduced pressure argon-containing liquid as feed into an argon column at an intermediate point of the argon column and separating the feed by cryogenic rectification into argon-richer fluid and argon-leaner fluid;
   (E) withdrawing argon-leaner fluid from the argon column, increasing its pressure, and passing increased pressure argon-leaner fluid into the main column system; and
   (F) recovering argon-richer fluid as product argon.

2. The method of claim 1 wherein the argon-containing vapor is condensed by indirect heat exchange with argon-leaner fluid.

3. The method of claim 1 wherein the main column system is a double column system comprising a lower pressure column and a higher pressure column wherein the argon-containing vapor is withdrawn from, and the argon-leaner fluid is passed into, the lower pressure column.

4. The method of claim 1 wherein the argon column is operating at least within its upper portion at a pressure less than ambient pressure.

5. The method of claim 3 wherein the operating pressure of the argon column is at least 3 psi below that of the lower pressure column.

6. The method of claim 3 further comprising passing argon containing vapor from the lower pressure column into the argon column.

7. A cryogenic rectification apparatus for producing argon comprising:
   (A) a main column system and means for providing feed into the main column system;
   (B) an argon column, a condenser and means for passing fluid from the main column system to the condenser;
   (C) means for passing fluid from the condenser into the argon column at an intermediate point of the argon column;
   (D) means for reducing the pressure of fluid passed from the condenser into the argon column;

(E) means for withdrawing fluid from the lower portion of the argon column, means for increasing the pressure of the withdrawn fluid, and means for passing the increased pressure withdrawn fluid into the main column system; and (F) means for recovering fluid taken from the upper portion of the argon column.

8. The apparatus of claim 7 wherein the condenser is within the lower portion of the argon column.

9. The apparatus of claim 7 wherein the main column system is a double column system comprising a lower pressure column and a higher pressure column wherein the means for passing fluid from the main column system to the condenser, and the means for passing increased pressure withdrawn fluid into the main column system, both communicate with the lower pressure column.

* * * * *